(12) United States Patent
Galatro et al.

(10) Patent No.: US 6,780,331 B2
(45) Date of Patent: Aug. 24, 2004

(54) OZONATION OF CONTAMINATED LIQUIDS UNDER HIGH PRESSURE

(75) Inventors: Thomas John Galatro, Mechanicsburg, PA (US); Steven Raymond Zimmers, Harrisburg, PA (US); Daniel Allen Delp, Port Trevorton, PA (US); John Hale Templeton, Westminster, CO (US); Frank Salvatore Capitani, Hershey, PA (US)

(73) Assignee: Science Applications International Corporation, San Diego, CA (US)

( * ) Notice: Subject to any disclaimer, the term of this patent is extended or adjusted under 35 U.S.C. 154(b) by 164 days.

(21) Appl. No.: 10/113,938

(22) Filed: Apr. 2, 2002

(65) Prior Publication Data

US 2003/0183584 A1 Oct. 2, 2003

(51) Int. Cl.⁷ .................................................. C02F 1/78
(52) U.S. Cl. ...................... 210/747; 210/759; 210/760; 210/170; 210/205; 210/218; 210/256; 166/265; 405/128.5
(58) Field of Search ................................. 210/759, 760, 210/761, 198.1, 205, 218, 220, 170, 747, 256, 908; 166/265, 266; 405/128.15, 128.5, 128.55, 263

(56) References Cited

U.S. PATENT DOCUMENTS

| | | | |
|---|---|---|---|
| 3,445,001 A | 5/1969 | Raus | |
| 3,823,923 A | 7/1974 | Chapsal | |
| 4,008,159 A | 2/1977 | Besik | |
| 4,021,347 A | 5/1977 | Teller et al. | |
| 4,033,875 A | 7/1977 | Besik | |
| 4,104,166 A | 8/1978 | LaRaus | |
| 4,230,571 A | 10/1980 | Dadd | |
| 4,250,040 A | 2/1981 | LaRaus | |
| 4,298,467 A | 11/1981 | Gartner et al. | |
| 4,804,478 A | 2/1989 | Tamir | |
| 4,824,563 A | 4/1989 | Iwahori et al. | |
| 5,004,537 A | 4/1991 | Brown | |
| 5,207,237 A | 5/1993 | Langford | |
| 5,217,609 A | 6/1993 | Holdeman | |
| 5,240,619 A | * 8/1993 | Copa et al. .................. 210/752 |
| 5,336,413 A | * 8/1994 | van Staveren .............. 210/650 |
| 5,376,265 A | 12/1994 | Szabo | |
| 5,399,267 A | 3/1995 | Wang et al. | |
| 5,427,693 A | 6/1995 | Mausgrover et al. | |
| 5,474,749 A | 12/1995 | Takeda | |
| 5,505,856 A | 4/1996 | Campen et al. | |
| 5,520,483 A | 5/1996 | Vigneri | |
| 5,545,330 A | 8/1996 | Ehrlich | |
| 5,562,822 A | 10/1996 | Furness, Jr. et al. | |
| 5,611,642 A | 3/1997 | Wilson | |
| 5,615,974 A | 4/1997 | Land et al. | |
| 5,626,745 A | 5/1997 | Hawkinson | |
| 5,635,059 A | 6/1997 | Johnson | |
| 5,674,382 A | * 10/1997 | Chapman ................... 210/96.1 |
| 5,683,576 A | 11/1997 | Olsen | |
| 5,698,092 A | 12/1997 | Chen | |
| 5,707,528 A | 1/1998 | Berry | |
| 5,709,799 A | 1/1998 | Engelhard | |

(List continued on next page.)

Primary Examiner—Frank M. Lawrence
(74) Attorney, Agent, or Firm—Banner & Witcoff, Ltd.

(57) ABSTRACT

Contaminated liquids are treated by ozonation in a pressurized environment. Ozone is injected into a contaminated liquid to form a gas/liquid mixture. The mixture is injected into a mixing chamber for providing turbulent gas/liquid contact. The mixture is flowed from the mixing chamber into a pressurized reaction vessel. In an alternative embodiment, contaminated liquid is treated in situ using pressurized injection wells for injecting ozone-containing liquid.

30 Claims, 4 Drawing Sheets

U.S. PATENT DOCUMENTS

| | | |
|---|---|---|
| 5,711,887 A | 1/1998 | Gastman et al. |
| 6,117,334 A | 9/2000 | Coury et al. |
| 6,197,206 B1 | 3/2001 | Wasinger |
| 6,206,098 B1 | 3/2001 | Cooper et al. |
| 6,280,625 B1 | 8/2001 | Jackson, Jr. et al. |
| 6,299,781 B1 | 10/2001 | Hanrahan |
| 6,352,387 B1 * | 3/2002 | Briggs et al. .......... 405/128.25 |
| 6,423,236 B1 * | 7/2002 | Shiota et al. ................ 210/761 |
| 6,457,905 B1 * | 10/2002 | Nickell .................... 405/128.5 |
| 6,517,729 B2 * | 2/2003 | Campo et al. .............. 210/758 |

* cited by examiner

OZONATION OF CONTAMINATED LIQUIDS UNDER HIGH PRESSURE

FIELD OF THE INVENTION

The present invention is directed to treatment of contaminated liquids and, more particularly, to ozonation of organic and inorganic constituents in aqueous solutions.

BACKGROUND OF THE INVENTION

Water from a variety of sources, such as industrial wastewater, groundwater, and the like, often contains unacceptable levels of a variety of organic and/or inorganic contaminants. The treatment of many of these contaminants is cumbersome and extremely expensive. One example of such a contaminant is methyltetra-butylether (MTBE). It is anticipated that over the next twenty years the United States will spend billions of dollars cleaning up MTBE pollution from leaking underground storage tanks (UST) at retail gasoline facilities. MTBE is considered to be a major health hazard and has contaminated numerous public drinking supply wells. The current environmental system of choice to treat MTBE is air stripping.

Air stripping involves a phase transfer of the target constituents from a liquid media to a gas media. Because the target constituents are removed rather than destroyed, air stripping systems are susceptible to off-gas discharge and typically require treatment of vapor phase constituents. Moreover, air stripping techniques are expensive, due in part to large power requirements needed for a blower for the stripping tower. Air stripping is particularly expensive for treating MTBE because an air stripping system needs to be designed that is almost three times the size of that required to treat traditional organic contaminants, such as benzene.

One chemical oxidation technique that has been used for treating contaminated water employs ultraviolet light and hydrogen peroxide to form hydroxyl radicals. A critical limitation of this technique is the ability of the ultraviolet to penetrate the liquid stream to react with the hydrogen peroxide to form the hydroxyl radical. This technique also requires significant energy to operate effectively, and UV lamp strength degradation over time lowers the efficiency of the system. This degradation can be caused by lamp life and also fouling of the lamp glass caused by hardness, suspended solids or other surface coating mechanisms that may be associated with a particular water or wastewater stream.

Another chemical oxidation method involves using a single oxidant at atmospheric pressure. For example, hydrogen peroxide is a strong oxidizer that can be used for treating contaminated groundwater. In a reaction known as the Fenton reaction, hydrogen peroxide can be mixed with a metallic salt such as ferrous sulfate to produce a free radical, which breaks bonds in the hydrocarbon molecule in an exothermic reaction to produce a low-free-energy state, generally comprising production of carbon dioxide and water.

In situ systems employing Fenton-type reactions are described, for example, in U.S. Pat. No. 4,591,443 to Brown and in U.S. Pat. No. 5,611,642 to Wilson. Each includes mixing the Fenton reactants prior to introduction into the soil and groundwater. U.S. Pat. Nos. 5,286,141 and 5,520,483, both to Vigneri, describe a remediation method and system that includes a pre-acidification of the ground water prior to a sequential introduction of the Fenton reactants, wherein hydrogen peroxide is added after an injection of ferrous sulfate at a high concentration.

Some water treatment processes have employed ozone in a pressurized system. For example, U.S. Pat. No. 6,197,206 to Wasinger describes a process for purifying MTBE contaminated water by treatment with air and/or ozone. The process utilizes a plurality of pressurized tanks with sufficient pressures to cause the ozone to maintain micro-sized bubbles. The pressure in the contact tanks is between about 3 psi and 30 psi, and preferably is about 20 psi. A gas/air stripper strips residual ozone from the water, and the residual gas is delivered to a destruction unit for removing any remaining ozone, MTBE, and oxidation products. The pressure is said to create micro-sized bubbles, which allow for more surface contact with the MTBE contaminated water and provide a faster rate of reaction.

In another approach, Mausgrover et al. U.S. Pat. No. 5,427,693 discloses a modular apparatus and associated method for generating ozone and for transferring the ozone into contaminated water. A venturi is connected to ozone generating means, and an infusion chamber is connected downstream from the venturi. A pump circulates water from a process tank through the venturi to the infusion chamber. The combination of the venturi and infusion chamber is said to produce a high mass transfer ratio of ozone into the water. The pressure maintained in the infusion chamber and the dimensions of the chamber are said to produce a headspace above the inlet that contributes to the formation of a vast number of relatively small bubbles.

There remains a need for a more cost-effective process for treating contaminated liquids. It would be desirable to develop a process that effectively converts contaminants by ozonation, while minimizing the quantity of ozone and other expensive reagents used.

BRIEF SUMMARY OF THE INVENTION

The present invention is directed to a process and apparatus for treating contaminated liquids by reaction with ozone in a pressurized vessel. Ozone is injected into a contaminated liquid to form a gas/liquid. The mixture is injected into a mixing chamber. The mixing chamber provides turbulent gas/liquid contact. The mixture is flowed from the mixing chamber into the pressurized reactor vessel, in which a pressure of at least about 45 psig is maintained.

In an alternative embodiment of the present invention, a contaminated liquid, such as contaminated groundwater, is treated in situ by ozonation. Influent liquid is fed into a pressurized vessel. Ozone is injected into a recirculated liquid stream to form a gas/liquid mixture. The gas/liquid mixture is mixed with recirculated headspace gas from the vessel to form a reactive mixture having an air-to-liquid ratio from about 0.25:1 to about 10:1. The reactive mixture is injected into an isolated mixing chamber. The reactive mixture is flowed from the mixing chamber into the pressurized vessel, in which a pressure of at least about 45 psig is maintained. The reactive mixture is injected into the ground using a pressurized well injection system.

The process of the present invention can yield significant operating cost savings over presently available technologies, e.g., by providing significant reductions in chemical and/or activated carbon capital costs and significant reductions in disposal and handling costs. Preferred embodiments of the present invention also provide relative ease of operation, by avoiding the need for cumbersome and expensive air stripping systems and the associated need for active carbon disposal or regeneration. Long-term operating costs can be reduced by virtue of the lower power requirements of an ozone generator, for example, compared to that of a blower required for an air stripping tower. The process of the present invention is effective independent of the clarity of the contaminated liquid, unlike conventional UV/hydrogen peroxide systems, because light is not required for the oxidizer. When hydrogen peroxide is used as a second oxidizer, ozone and hydrogen peroxide are both dissolved in the liquid to form hydroxyl radicals.

BRIEF DESCRIPTION OF THE DRAWINGS

The present invention will now be described in more detail with reference to preferred embodiments of the invention, given only by way of example, and illustrated in the accompanying drawings in which.

DETAILED DESCRIPTION OF THE INVENTION

The process of the present invention is particularly useful for the treatment of contaminated liquids, e.g., recovered groundwater, that contain organic and/or inorganic compounds that are difficult to treat by conventional techniques, for example because of limited adsorption coefficient to activated carbon treatment systems, or that require large and expensive air stripping systems. Non-limiting examples of such compounds include methyltetrabutylether (MTBE, a common gasoline additive), vinyl chloride, and methylene chloride, ammonia, arsenic, benzene, ethylbenzene, tetrachloroethene, trichoroethene, toluene, and xylenes. In addition, the process of the present invention may be a useful alternative to conventional treatment methods for non-target constituents under certain circumstances, e.g., to meet stringent off-gas emission standards. In general, the process is useful for treating aqueous solutions containing one or more compounds that can be oxidized to render the aqueous solution less odorous, less toxic, and/or otherwise more environmentally acceptable. The total level of contaminants in the influent liquid most often ranges from 0 to about 750 ppm.

The process of the present invention can be used for treating liquid streams with high levels of suspended solids, dissolved metals, and/or inorganic constituents. Once oxidized, these materials precipitate out and can be easily recovered. In some cases, it may be necessary to further reduce carbonaceous loading and oxygen demand. For example, industrial wastewater can be pre-treated in advance of biological wastewater treatment, e.g., for reducing chemical oxygen demand (COD), biochemical oxygen demand (BOD), total organic carbon (TOC), oil and grease, and the like. Other applications of the present invention include without limitation cooling tower water treatment, in situ oxidation of soil and groundwater contaminants, drinking water disinfection, and food processing (e.g., fruit and vegetable disinfection).

Figure 1:
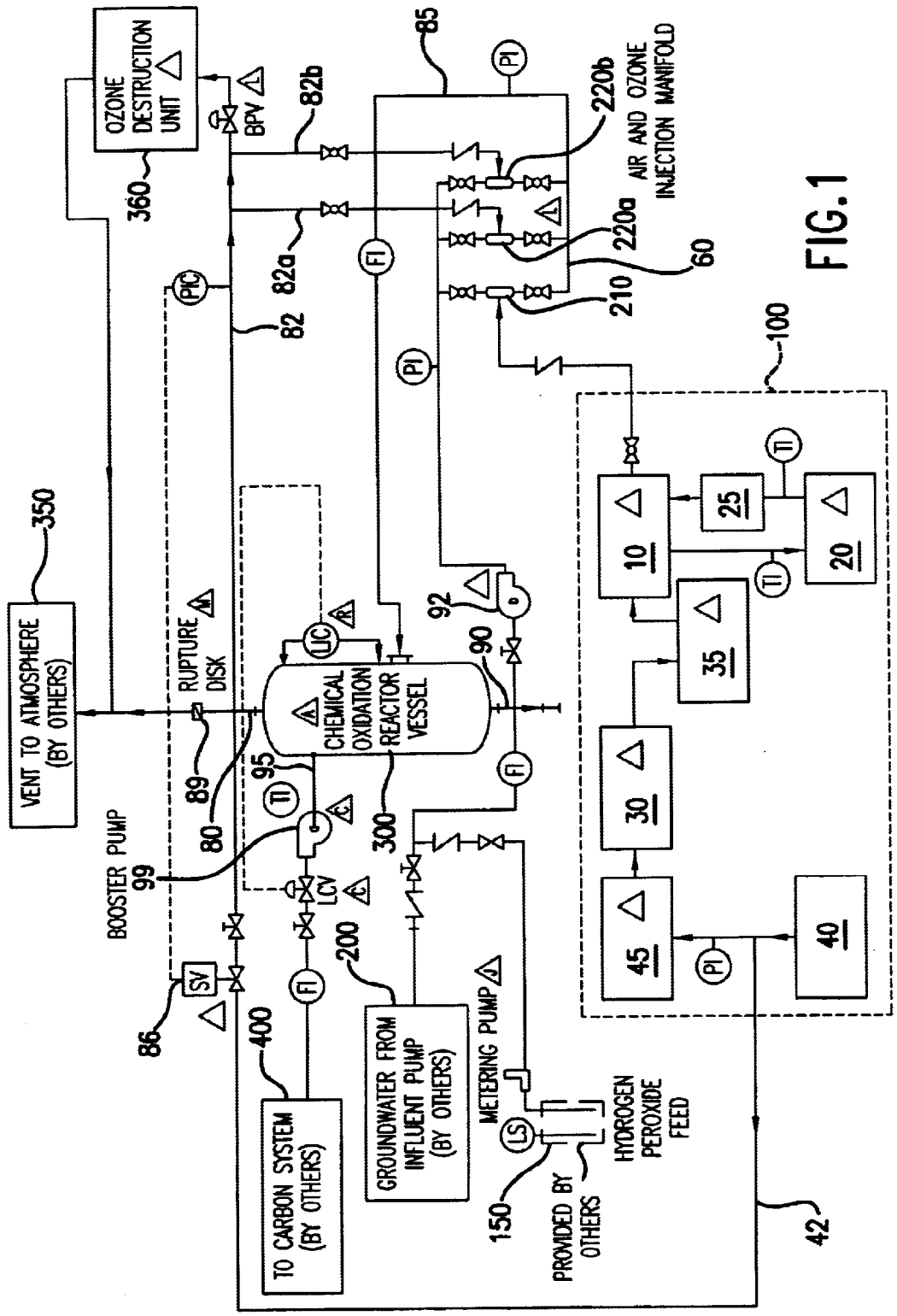
FIG. 1 is a schematic illustration of an ozonation process in accordance with a preferred embodiment of the invention.

With reference to a preferred embodiment of the invention illustrated in FIG. 1, an ozone supply system 100 typically includes an ozone generator 10, a coolant system 20 for circulating cooling water or other suitable coolant, an oxygen concentrator 30, and oxygen receiver 35. A preferred ozone generator 10 is a water-cooled ozone generator available from Ozone Technologies (UK). A filter 25 can be provided for filtering the coolant. An air compressor 40 and air dryer 45 are provided for supplying oxygen to the oxygen concentrator 30. The ozone gas is cooled to permit the ozone generator 10 to produce higher concentrations of ozone. The cooling water temperature typically is below about 55° F. and preferably ranges from about 35 to 40° F. At temperatures above about 70° F., the degradation of ozone due to temperature significantly reduces ozone concentrations. Temperature sensors (TI) preferably are provided for monitoring the temperature of the coolant, and control means may be provided for automatically regulating the coolant temperature.

The flowrate of the ozone from the ozone generator 10 will depend on the specific requirements of a particular application. In general, the required flowrate of ozone is determined based on the mass of the constituents in the influent liquid to be oxidized. Liquid samples may be tested to account for ozone consumption due to non-target constituents that may be oxidized. Presently available ozone generators typically deliver ozone at relatively low pressure, e.g., a maximum pressure of 10 to 11 psig. However, it is contemplated that ozone generators can be designed to supply ozone at significantly higher pressures, e.g., as high as 100 psig or more, for use in the present invention. The ozone flowrate for presently available ozone generators typically ranges from about 100 to about 500 grams per hour.

The flowrate of the influent liquid generally is governed by the system's capacity to generate ozone. When using ozone generators having the maximum capacity presently available, e.g., about 500 grams per hour, it is possible to economically treat contaminated liquid up to about 200 gpm. The system can be configured to handle higher quantities of influent liquid, e.g., as high as 1000 gpm or more, by employing multiple and/or larger reactor vessels 300 and by providing multiple ozone generators 10.

The influent liquid 200 is contacted with ozone using a conventional venturi gas injector 210. The venturi gas injector 210 creates micro-bubbles that, together with the mixing chamber 250 and high pressure reactor vessel 300, provide enhanced surface contact between the ozone and the target constituents, thereby providing improved mass transfer properties.

The influent gas/liquid mixture 60 is combined with recirculation liquid 90 into which recirculated headspace gas 82a, 82b has been injected via injectors 220a, 220b. Because of the relatively large quantities of headspace gas 80 that are recirculated, it is preferred (but not required) that at least two injectors 220a, 220b be used for injecting the recirculated headspace gas 82a, 82b. A recirculation pump 92 having a variable speed motor is provided for feeding and pressurizing the combined influent and recirculation gas/liquid mixture. Recirculating the headspace gas provides a number of benefits in addition to pressurization, such as recycling residual ozone gas and volatile organics to the reactor vessel. Recycling ozone improves efficiency and cost effectiveness by reducing the amount of unreacted ozone in the vent stream. Recycling volatile organic compounds increases conversion and thus improves off-gas control. The recirculation of the head space gas (containing ozone), in combination with the gas/liquid contact provided by the mixing chamber 250, increases the system's ability to dissolve ozone at high pressures, e.g., in concentrations approaching saturation.

The combined stream 85, which includes influent liquid, recirculation liquid, ozone, and recirculated headspace gas, is fed to the mixing chamber 250 (not shown in FIG. 1). In the preferred embodiment illustrated in FIGS. 1 and 1A, the mixing chamber 250 is located within the reactor vessel 300. It is contemplated that the mixing chamber 250 alternatively can be located outside of the reactor vessel 300. In the preferred embodiment illustrated in FIGS. 1 and 1A, the pressure inside the mixing chamber 250 is the same as the system operating pressure (i.e., reactor vessel pressure).

Figure 1A:
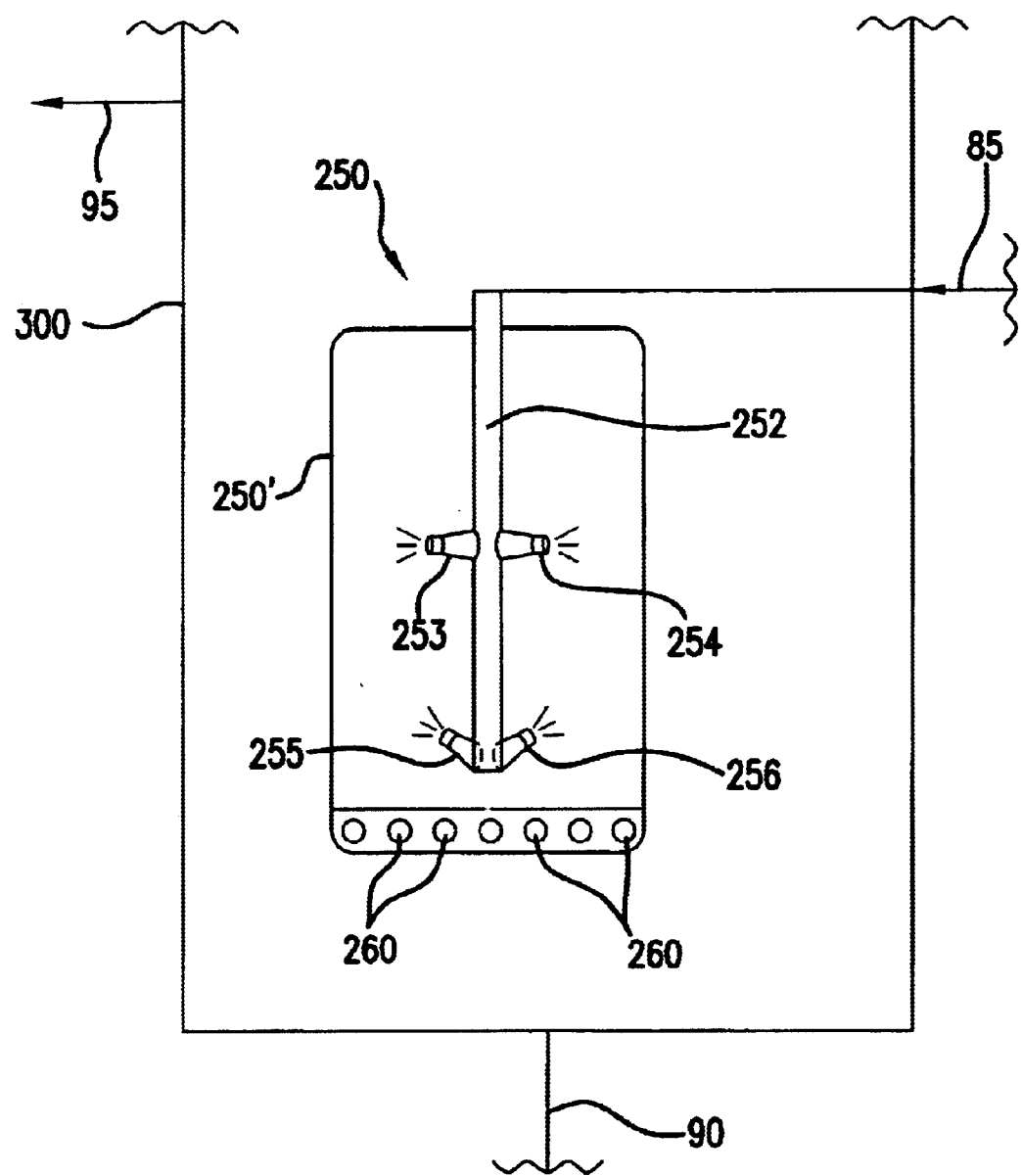
FIG. 1A is a schematic illustration of a mixing chamber inside of a pressurized reactor vessel in accordance with a preferred embodiment of the invention.

As shown in FIG. 1A, the mixing chamber 250 comprises a small diameter pipe 250' located in the reactor vessel 300. An injection pipe 252 extends downward and has a plurality of nozzles 253, 254, 255, 256 for injecting the combined stream into the mixing chamber 250. Two of the nozzles 253, 254 are positioned about half way down the length of the small diameter pipe 250' and are pointed horizontally outward, i.e., toward the inner surface of the small diameter pipe 250'. The other two nozzles 255, 256 are located at the bottom of the injection pipe 252 and are pointed upward. This configuration creates very turbulent gas/liquid mixing conditions that are favorable for maximizing contact between ozone and the oxidizable constituents in the liquid. The mixing chamber 250 also includes a plurality of orifices 260 through which the liquid may exit horizontally into the reactor vessel 300 and eventually to the reactor effluent 95. Liquid from the mixing chamber 250 also may flow into the recirculation line 90 and back into the gas injection system. Other mixing chamber configurations are possible for providing turbulent gas/liquid mixing, and should be regarded as falling within the scope of the present invention.

The dimensions of the mixing chamber and reactor vessel can be determined based on such factors as flowrate and required retention time. The retention time typically ranges from about 10 to about 40 minutes, more often from about 15 to about 30 minutes. The diameter of the reactor vessel typically ranges from about 3 to about 6 feet. The diameter of the mixing chamber most often ranges from about 6 to about 18 inches. It should be understood that these dimensions and parameters are merely exemplary and that the actual dimensions and parameters may vary significantly, for example when higher volumes of influent are treated and/or when the influent contains higher levels of contaminants.

Headspace is maintained in the reactor vessel 300, e.g., by maintaining about 1 foot between the surface of the liquid and the top of the reactor vessel 300. Preferably, a level controller (LIC) is provided for sensing the liquid level and actuating a valve (LCV) to increase or decrease the flow of effluent 95 from the reactor vessel 300 to maintain an appropriate liquid level. This can be accomplished by submerging a discharge pipe (not shown) below the liquid surface to maintain a water seal and to isolate the headspace gas used for recirculation. The level control valve maintains the liquid level above the bottom of the discharge pipe. A pump 99 may be provided for feeding the effluent 95 to an optional carbon polishing system 400 or other post-treatment unit.

The air-to-liquid ratio obtained by recirculating the headspace gas can be selected in accordance with the particular contaminant(s) to be oxidized. Some species of organic compounds are oxidized more efficiently in the gas phase while others are oxidized faster in the liquid phase. The contact between the dissolved organic compounds and ozone can be improved by selecting an air-to-liquid ratio to optimize the phase transfer effect between the ozone in the fine bubbles and the compounds to be oxidized in the liquid. This physical diffusion of the gas and organic compounds enhances the contact with ozone and facilitates the chemical oxidation reaction at the surface of the bubble. Recirculating the headspace gas also improves efficiency and effectiveness by recycling gaseous ozone and volatile organic compounds. It has been found that air-to-liquid ratios ranging from about 0.25:1 to about 10:1, preferably from about 0.5:1 to about 10:1, and even more preferably from about 1:1 to about 10:1 (mass/mass) are particularly effective for treating most contaminated liquid streams.

The temperature in the reactor vessel preferably is maintained below about 70° F. and more preferably below about 60° F. to help prevent ozone degradation. The operating temperature most often ranges from about 35° F. to about 70° F. Temperatures in excess of about 70° F. preferably are avoided because ozone degrades to molecular oxygen ($O_2$) more readily at these higher temperatures.

The pressure within the reactor vessel is at least about 45 psig. Reactor vessel pressures often are about 50 psig or higher. It is contemplated that significantly higher pressures (e.g., 80–120 psig or more) may be employed in more difficult applications having high ozone demand. There is no particular upper limit contemplated for the reactor vessel pressure. The air compressor 40 may be used, as needed, for reactor pressurization by introducing compressed air via line 42 into the gas recirculation line 82. The reactor vessel pressure, as used herein, refers to the pressure of the headspace gas.

A pressure gauge (PIC) may be used for sensing the pressure in the gas recirculation line 82. The pressure gauge can be in communication with a valve 86 that automatically opens in response to a decrease in pressure, and automatically closes once the appropriate operating pressure is obtained. A rupture disk 89 may be provided for relieving pressure in the event of excessive pressure buildup in the reactor vessel 300. The discharged gas can be vented to an exhaust system 350 and/or a suitable ozone destruction unit 360. A variety of types of ozone destruction units are commercially available. Preferably, a metal catalyst ozone destruction unit 360 is provided for converting residual ozone to molecular oxygen.

Optionally, further treatments such as carbon polishing 400 can be employed, for example if needed for stringent off-gas requirements. It may be desirable to provide a carbon polishing unit 400 as a safeguard to ensure that effluent requirements are continuously met.

The solubility of ozone is increased in the pressurized environment of the present process. The solubilized ozone reacts with the contaminant(s), yielding generally less harmful reaction products such as carbon dioxide, water, chloride salts, and the like. Optionally, a second oxidizer is used in addition to ozone. Non-limiting examples of second oxidizers that may be used include potassium permanganate, Caro's Acid, and hydrogen peroxide. Hydrogen peroxide is a preferred second oxidizer for use with ozone. Hydrogen peroxide forms hydroxyl radicals that oxidize organic compounds. Depending on such factors as the type and concentration of the compound(s) in the influent liquid, ozone and hydrogen peroxide together may yield a higher oxidation potential than is yielded by either oxidizer alone. For example, the combination of ozone and hydrogen peroxide is particularly effective for treating liquid containing MTBE or other organic compounds that are difficult to oxidize. Two or more oxidizers can be used in accordance with the other process conditions described elsewhere herein.

As illustrated in FIG. 1, a hydrogen peroxide feed 150 supplies hydrogen peroxide, generally at a range of from about 0.1 to about 0.5 wt/wt based on the amount of ozone. When hydrogen peroxide is used as a second oxidizer, it is preferable to introduce hydrogen peroxide into the influent liquid immediately upstream of the recirculation pump 92 and the ozone injector 210 to provide readily available contaminant targets for the fast-reacting hydroxyl radical.

Figure 2:
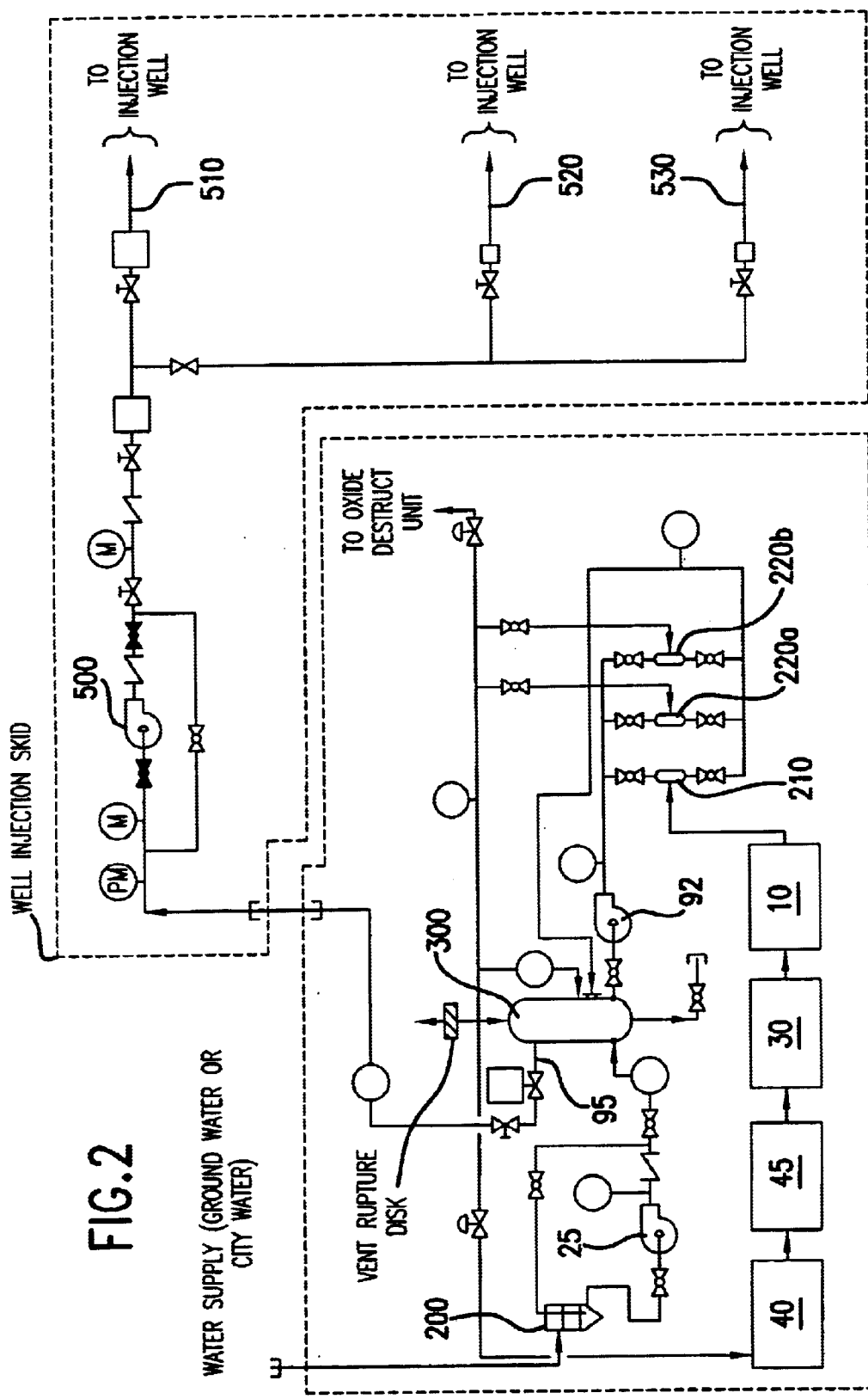
FIG. 2 is a schematic illustration of an in situ ozonation process in accordance with an alternative embodiment of the invention.

In accordance with an alternative embodiment of the invention, organic compounds in contaminated liquids, such as sub-surface groundwater, are oxidized in situ. As illustrated in FIG. 2, a similar system as previously described can be used for preparing a pressurized liquid/ozone mixture. The influent water is fed to an influent tank 200' and pumped into the reactor vessel 300 via an influent pump 25. Ozone is generated by an ozone generator 10, and is combined with recirculated liquid and recirculated headspace gas via injectors 210 (liquid), 220a and 220b (recirculated headspace gas). The combined stream is fed into the mixing chamber 250 within the pressurized vessel 300, as in the previous embodiment. The effluent stream 95 from the pressurized vessel, i.e., a liquid stream containing solubilized ozone, is further injected into one or more pressurized injection wells 510, 520, 530 with the aid of a booster pump 500. The booster pump 500 assists in delivering the liquid (containing dissolved ozone) to the injection depths. The injection pressure depends on such factors as the mass rate of ozone required and the injection depth. The injection pressure typically is at least about 80 psig and may be as high as 100 psig or more.

Figure 3:
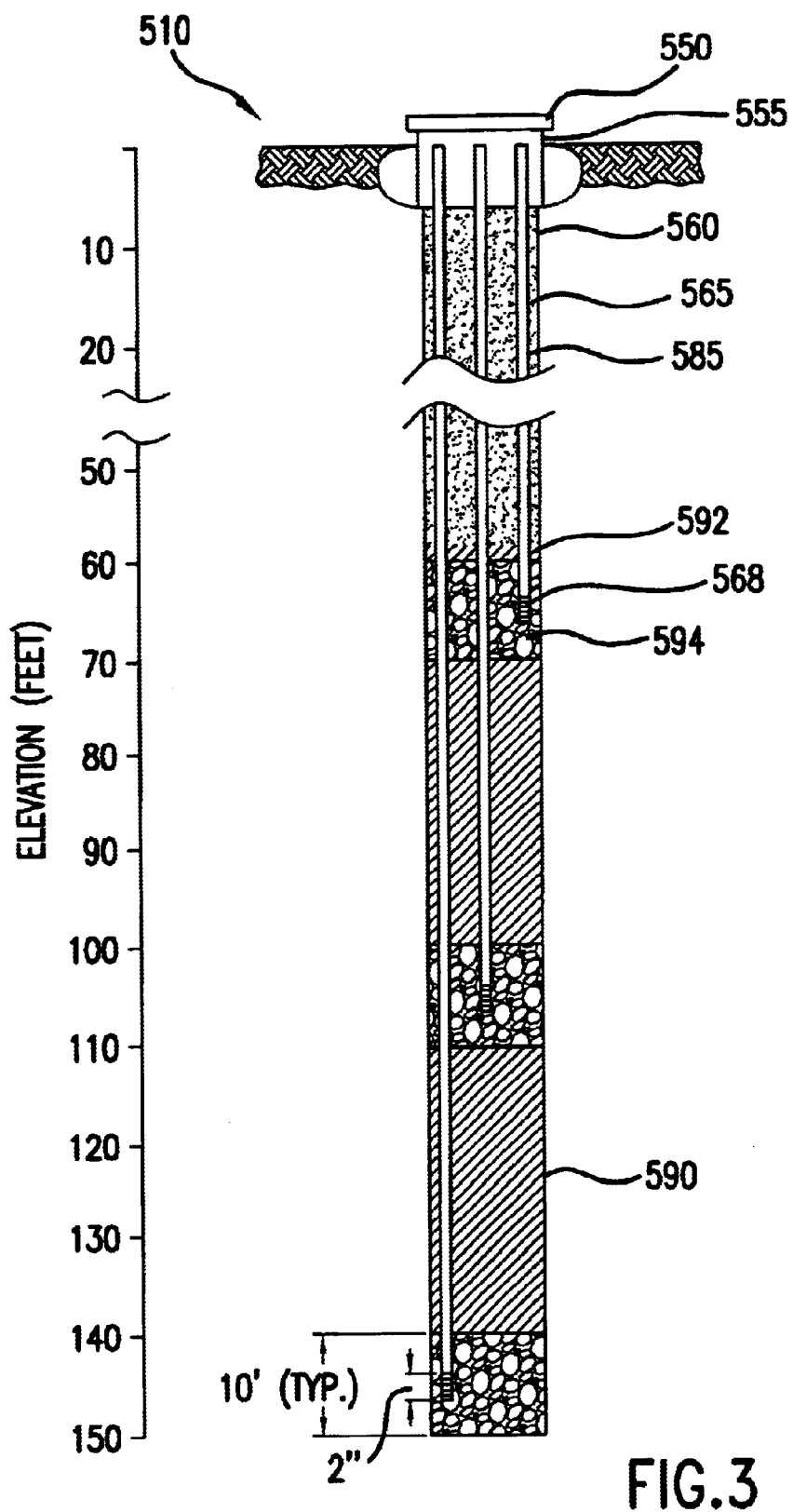
FIG. 3 is a schematic illustration of a well injection system in accordance with the in situ ozonation process illustrated in FIG. 2.

As illustrated in FIG. 3, the pressurized injection well 510 discharges the effluent stream 95 deep below the ground surface, preferably to depths of at least about 75 feet for effective in situ ozonation. The injection well 510 typically has a locking cap 550 and a protector pipe 555, the latter of which is 12 inches in diameter and extends 2 feet above and 6 feet below the surface. The boring 560 typically is about 10 inches in diameter. The injection well 510 also includes a plurality of injection pipes 565 that are 2 inches in diameter. The injection pipes 565 may be constructed of any suitable material, such as PVC, and preferably extend to a variety of injection depths (e.g., 75 feet, 100 feet, 150 feet, etc.). Each of the injection pipes is pressurized over the entire injection depth. In general, greater injection depths provide for more effective in situ ozonation.

A screen is provided at each injection depth, which typically includes about 1 foot of bentonite pellets 592, and a 10-foot pea gravel pack 594. The injection pipe 565 typically terminates with 2 feet of a flush-threaded, 40-slot screen 568. The injection well 510 of FIG. 3 illustrates employing bentonite 590 to fill the boring 560 at depths greater than about 75 feet, and cement grout 585 to fill the bore up to about 75 feet. As will be apparent to persons skilled in the art, the particular materials used for filling the boring 560 and the depths will depend on the geological conditions at the site of the injection well 510.

EXAMPLE 1

This example illustrates treating 20 gpm groundwater containing about 100 ppm of chlorinated organics. An ozone generator (Ozone Technologies, UK) delivered ozone at 100 grams per hour (about 11 liters per minute) at a pressure of about 10 psig. The reactor vessel was 4 feet in diameter, and the mixing chamber was a 10 inch-diameter pipe located in the reactor vessel. A pipe extending into the mixing chamber had four spray nozzles for creating turbulent gas/liquid mixing conditions in the mixing chamber, as illustrated in FIG. 1A. The reactor vessel temperature was maintained at 55° F. and reactor pressure at 50 psig. The residence time in the reactor vessel was about 15 minutes. The headspace gas was recirculated to achieve an air-to-liquid ratio of 2.5:1. The system was found to be extremely effective for treating the chlorinated groundwater.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A process of treating contaminated liquid by reaction with ozone in a pressurized reactor vessel, the method comprising:

injecting ozone into a contaminated liquid to form a gas/liquid mixture;

injecting said mixture into an injection pipe located within a mixing chamber which in turn is located within said pressurized reactor vessel; wherein said injection pipe has a plurality of nozzles for injecting said mixture into said mixing chamber and causing turbulent gas/liquid contact within said mixing chamber; and flowing said mixture from said mixing chamber into said pressurized reactor vessel, wherein a pressure of at least about 45 psig is maintained in said reactor vessel.

2. A process of treating contaminated liquid by reaction with ozone in a pressurized reactor vessel, the method comprising:

injecting ozone into a contaminated liquid to form a gas/liquid mixture;

combining said gas/liquid mixture with recirculated headspace gas from said reactor vessel to form a reactive mixture having an air-to-liquid ratio of from about 0.25:1 to about 10:1;

injecting said reactive mixture into a mixing chamber for providing turbulent gas/liquid contact; and flowing said reactive mixture from said mixing chamber into said pressurized reactor vessel, wherein a pressure of at least about 45 psig is maintained in said reactor vessel.

3. The process of claim 2 wherein a temperature of from about 35° F. to about 70° F. is maintained in said reactor vessel.

4. The process of claim 2 wherein said contaminated liquid contains a contaminant selected from the group consisting of MTBE, vinyl chloride, methylene chloride, ammonia, arsenic, benzene, ethylbenzene, tetrachloroethene, trichoroethene, toluene, xylene, and mixtures thereof.

5. The process of claim 2 wherein said pressure in said reactor vessel is at least about 50 psig.

6. The process of claim 5 wherein said pressure in said reactor vessel is at least about 80 psig.

7. The process of claim 2 further comprising combining a second oxidizer with said contaminated liquid.

8. The method of claim 7 wherein said second oxidizer comprises hydrogen peroxide.

9. The process of claim 2 wherein said air-to-liquid ratio is about 0.5:1 to about 10:1.

10. The process of claim 9 wherein said air-to-liquid ratio is about 1:1 to about 10:1.

11. A process of treating contaminated liquid in situ by reaction with ozone in a pressurized environment, the method comprising:

injecting influent liquid into a pressurized vessel;

injecting ozone into a recirculated stream from said vessel to form a gas/liquid mixture;

combining said gas/liquid mixture with recirculated headspace gas from said vessel to form a reactive mixture having an air-to-liquid ratio of from about 0.25:1 to about 10:1;

injecting said reactive mixture into a mixing chamber for providing turbulent gas/liquid contact;

flowing said reactive mixture from said mixing chamber into said vessel, wherein a pressure of at least about 45 psig is maintained in said vessel; and injecting said reactive mixture into the ground.

12. The process of claim 11 wherein a temperature of from about 35° F. to about 70° F. is maintained in said vessel.

13. The process of claim 11 wherein said contaminated liquid contains a contaminant selected from the group consisting of MTBE, vinyl chloride, methylene chloride, ammonia, arsenic, benzene, ethylbenzene, tetrachloroethene, trichoroethene, toluene, xylene, and mixtures thereof.

14. The process of claim 11 wherein said pressure in said vessel is at least about 50 psig.

15. The process of claim 14 wherein said pressure in said vessel is at least about 80 psig.

16. The process of claim 11 wherein the reactive mixture is further pressurized to an injection pressure of at least about 80 psig prior to injection into the ground.

17. The process of claim 16 wherein said injection pressure is at least about 90 psig.

18. The process of claim 17 wherein said injection pressure is at least about 100 psig.

19. The process of claim 11 wherein the reactive mixture is injected into the ground to an injection depth of at least about 75 feet.

20. The process of claim 19 wherein said injection depth is at least about 100 feet.

21. The process of claim 20 wherein said injection depth is at least about 150 feet.

22. The process of claim 11 wherein said air-to-liquid ratio is about 0.5:1 to about 10:1.

23. The process of claim 22 wherein said air-to-liquid ratio is about 1:1 to about 10:1.

24. An apparatus for treating contaminated liquid by reaction with ozone in a pressurized reactor vessel, the apparatus comprising:

a conduit for feeding an influent liquid;

an ozone generator;

a first gas injector for injecting ozone into the influent liquid to form a gas/liquid mixture;

a second gas injector for injecting recirculated headspace gas from said reactor vessel into said gas/liquid mixture to form a reactive mixture;

a mixing chamber for providing turbulent mixing conditions for said reactive mixture; and a generally enclosed reactor vessel for maintaining said reactive mixture in a pressurized environment.

25. The apparatus of claim 24 wherein said mixing chamber comprises a generally cylindrical member and an injection pipe having a plurality of nozzles for providing turbulent mixing conditions within said generally cylindrical member.

26. The apparatus of claim 24 wherein said mixing chamber is located within said reactor vessel.

27. The apparatus of claim 24 further comprising a pressurized injection well for injecting said reactive mixture into the ground.

28. A process of treating contaminated liquid by reaction with ozone in a pressurized reactor vessel, the method comprising:

injecting ozone into a contaminated liquid to form a gas/liquid mixture;

combining said gas/liquid mixture with recirculated headspace gas from said reactor vessel to form a reactive mixture;

injecting said reactive mixture into a mixing chamber for providing turbulent gas/liquid contact; and flowing said reactive mixture from said mixing chamber into said pressurized reactor vessel.

29. The process of claim 28 wherein a pressure of at least about 45 psig is maintained in said reactor vessel.

30. The process of claim 28 wherein said combined reactive mixture has an air-to-liquid ratio of from about 0.25:1 to about 10:1.

* * * * *